UNITED STATES PATENT OFFICE.

ALBERT HESSE, OF LEIPSIC, GERMANY, ASSIGNOR TO HEINE & CO., OF SAME PLACE.

TERPENE ALCOHOL.

SPECIFICATION forming part of Letters Patent No. 577,302, dated February 16, 1897.

Application filed October 13, 1894. Serial No. 525,826. (Specimens.)

*To all whom it may concern:*

Be it known that I, ALBERT HESSE, a subject of the King of Prussia, Emperor of Germany, residing at Leipsic, in the Kingdom of Saxony, Germany, have invented a certain new and useful Process of Producing a new Terpene Alcohol termed Reuniol, of which the following is a specification.

The terpene alcohols which have up to the present been discovered to be present in geranium-oils are "geraniol" (Jacobsen, *Lieb. Annalen d. Chemie*, Vol. 157, page 232) and "rhodinol," (Monnet and Barbier, *Comptes Rend.*, Vol. 117, page 1,092.)

According to the latest experiments (Bertram and Gildemeister, *Journ. f. Pract. Chemie*, Vol. 49, page 186) these have, however, been proved to be identical. I have discovered a terpene alcohol $C_{10}H_{20}O$, hitherto unknown, to be present, partly in a free state, partly combined as ester, in some kinds of geranium-oils, such, for instance, as the African variety and that of the Island Reunion. This new terpene alcohol boils under ordinary air-pressure at 226° centigrade and under a pressure of twenty-five millimeters at 128° centigrade. Its specific gravity is equal to 0.865 at a temperature of 20° centigrade, that of its acetic ester equal to 0.899, geraniol equal to 0.879, and geranyl-acetic ester equal to 0.913 at 20° centigrade. It differs from geraniol and rhodinol not only in respect of its physical properties and its chemical formula, but also in that it will not combine with calcium chlorid. It possesses a much more intensive and lasting odor of roses than does geraniol, and is on this account particularly adapted for employment in the perfumery industry.

Example: Ten kilos Reunion geranium oil and 2.5 kilos of hydrate of potassium dissolved in fifteen kilos of ethyl alcohol are boiled two hours. The product of reaction freed from the ethyl alcohol, together with the same quantity by weight of camphoric-acid anhydrid, is then kept at a constant temperature of 140° centigrade for one day. In the resulting product steam is introduced and all volatile combinations therewith distilled off. The camphoric ester remaining in the distilling vessel, together with twelve kilos of hydrate of potassium and forty-five kilos of alcohol, is heated under pressure for two hours. The alcohol is then driven off and the terpene alcohol rectified with steam or *in vacuo*. The same result can be obtained by converting the terpene alcohol in other acid esters non-volatilizable in steam, as succinic-acid ester, phtalic-acid ester, &c., by using all the correspondent molecular quantities of succinic-acid anhydrid, phtalic-acid anhydrid, &c., instead of camphoric-acid anhydrid.

What I claim is—

The herein-described process for producing a new terpene alcohol from volatile saponified oils, particularly African, Reunion, and other geranium oils, by heating the said oils with an acid anhydrid, such as camphoric-acid anhydrid, succinic-acid anhydrid, phtalic-acid anhydrid, which converts the terpene alcohol into acid esters non-volatilizable in steam, then removing the non-alcoholic ingredients by distillation with steam, then saponifying the residual esters with alkalies, also under pressure, and subsequently distilling the terpene alcohol with steam substantially as described.

In testimony whereof I have signed my name to this specification in the presence of two subscribing witnesses.

ALBERT HESSE.

Witnesses:
F. W. C. SCHMIDT,
ALB. STECHE.